Figure 1:
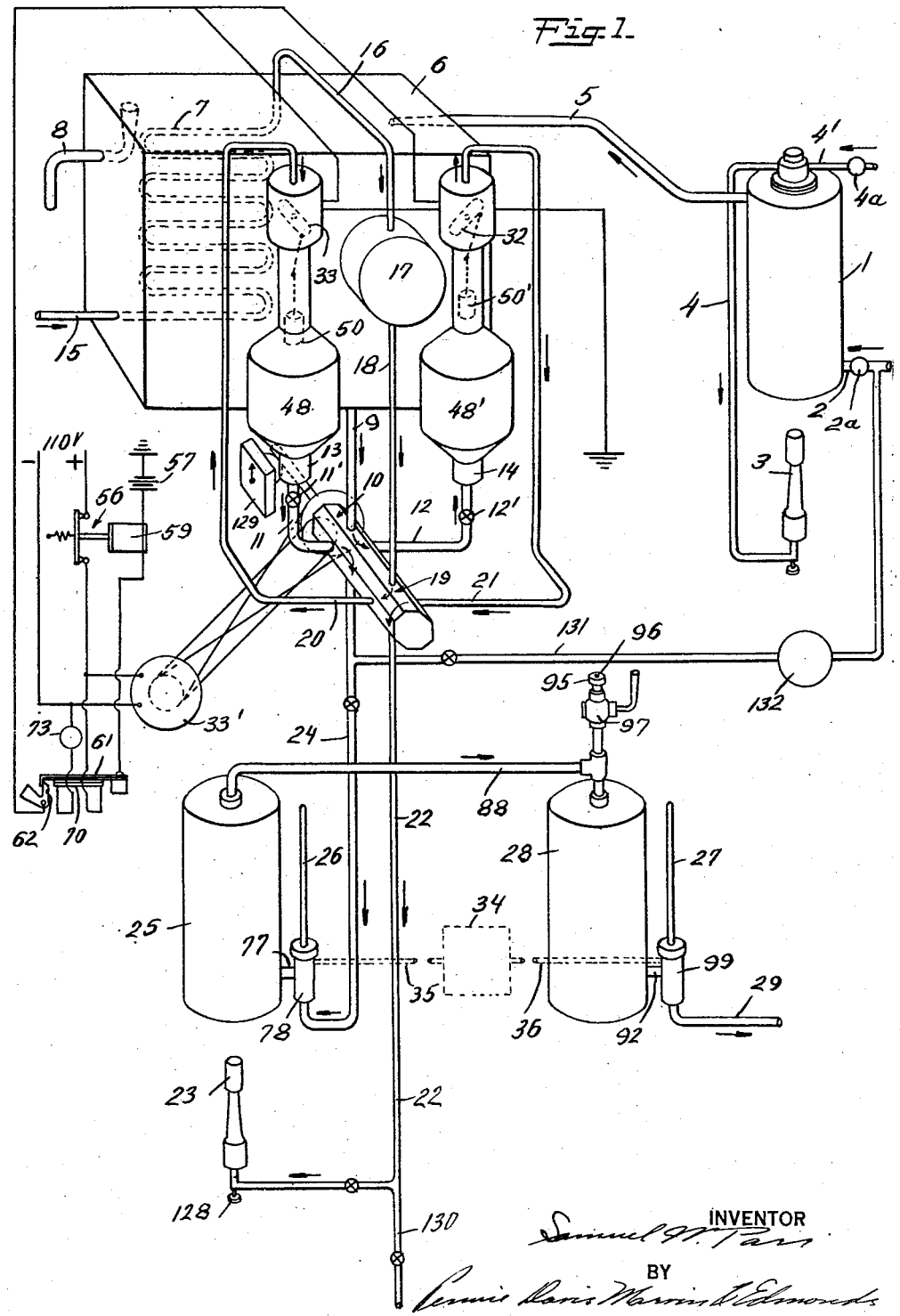

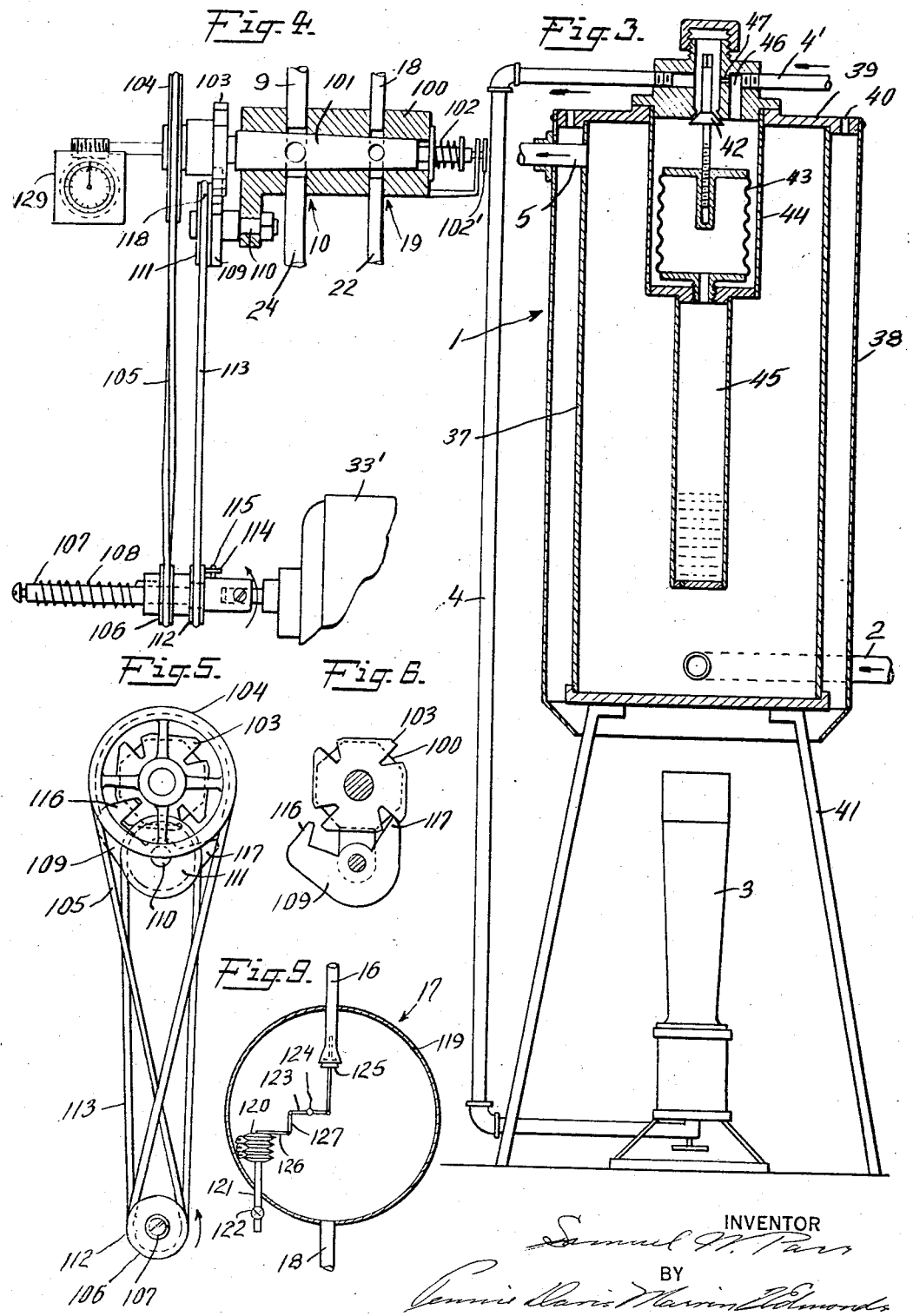

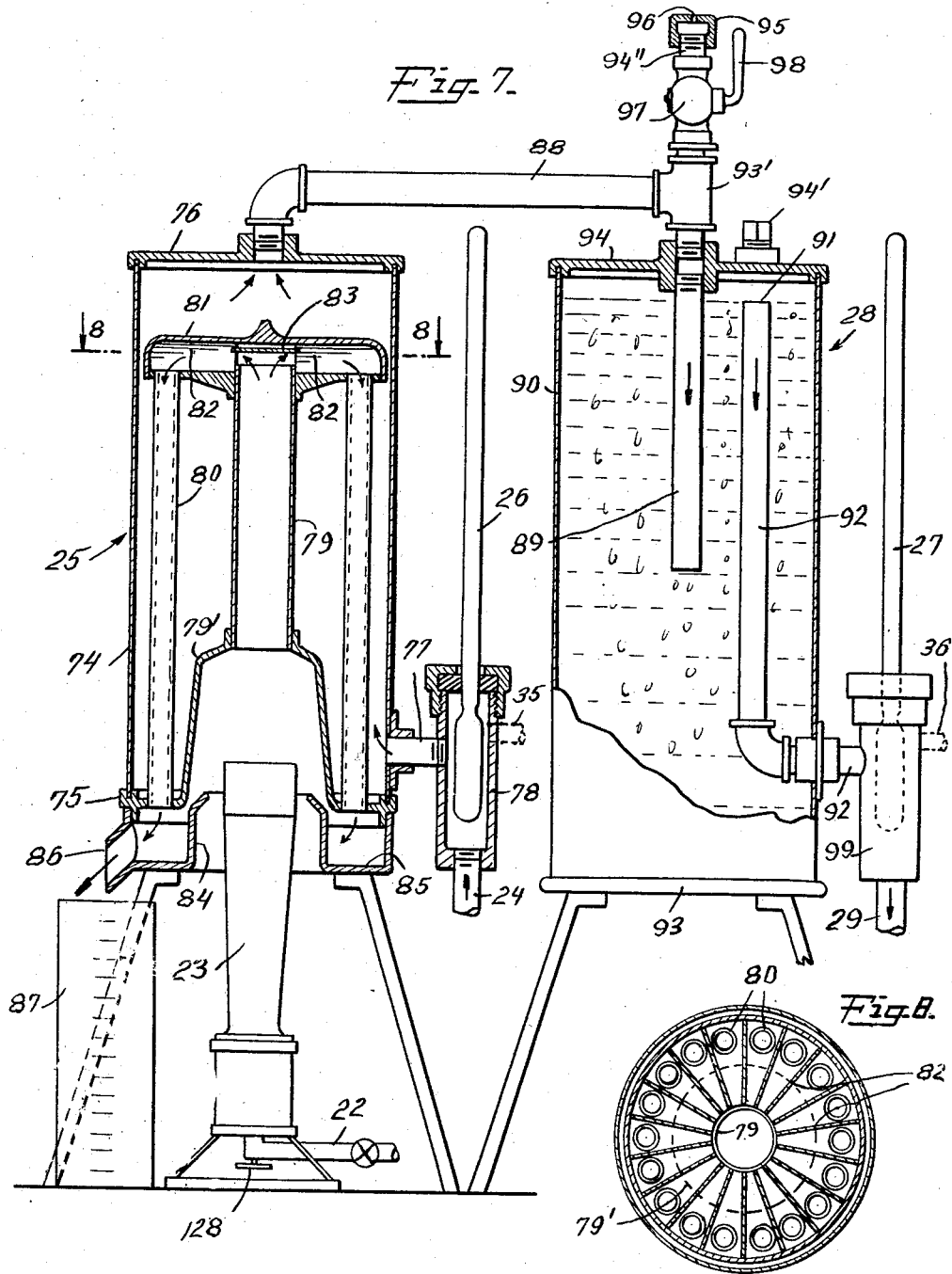

Patented Oct. 21, 1930

1,779,371

UNITED STATES PATENT OFFICE

SAMUEL W. PARR, OF URBANA, ILLINOIS, ASSIGNOR TO BURGESS-PARR COMPANY, OF MOLINE, ILLINOIS, A CORPORATION OF DELAWARE

GAS CALORIMETER

Application filed March 9, 1926. Serial No. 93,405.

This invention relates to gas calorimeters, the principal object of the invention being to provide an improved device for measuring the calorific value of any combustible gas, for example, ordinary producer gas. The invention is capable of providing a continuous indication or record of the calorific value of a combustible gas supplied from any source.

It will be appreciated that the heating value of any combustible gas can be determined by ascertaining its effect on a body of liquid, such as water, when the gas is burned in heat exchanging relation with the liquid. The calorific value of a gas is ordinarily expressed in British thermal units per cubic foot of gas under certain definite conditions of temperature and pressure. The B. t. u. has been defined as the quantity of heat required to raise the temperature of one pound of pure water one Fahrenheit degree. It is therefore apparent that if a cubic foot of gas under standard conditions of temperature and pressure (say 60 degrees Fahrenheit and 30 inches of mercury) be burned under a cubic foot of water, then, neglecting radiation losses, the calorific value of the gas expressed in B. t. u, per cubic foot is equal to the change in temperature of the water expressed in degrees Fahrenheit, multiplied by the weight of a cubic foot of water. It is also true that the calorific value of a gas can be ascertained directly by noting the temperature change produced by the combustion of the gas when certain volumes of the gas are burned so as to deliver their heat units to equal volumes of water.

One of the principal objects of this invention is to provide a calorimeter in which equal volumes of gas are burned under equal volumes of water at constant temperature and pressure whereby the calorific value of the gas can be determined by applying a single factor to the temperature rise caused by the combustion of the gas.

This invention contemplates the provision of means whereby a continuous flow of water to a suitable heater is accompanied by a continuous flow of gas to the burner of this heater. The flow of water and gas is controlled in such a manner that the volume of water supplied to the heater is equal to, or bears a predetermined relation to, the volume of gas supplied to the heater, and means are provided for insuring a constant temperature and pressure of the gas so supplied to the burner.

While the improved calorimeter is preferably constructed so as to deliver equal volumes of gas and water, it is to be noted that the quantity of gas or of water need not be ascertained in order to determine the calorific value of the gas. In other words, in order to determine the calorific value of the gas, it is not necessary to determine the amount or quantity of gas or of water passing through the calorimeter. The quantity of gas can be ascertained if this is desired, but it is not necessary to ascertain this factor in order to determine the calorific value of the gas. The embodiment of the invention hereinafter described in detail includes means for raising the temperature of the water to a certain predetermined value prior to the entrance of this water into the heater wherein its temperature is raised by the gas being tested. The water may be preliminarily heated by any suitable means but I prefer to employ a gas burner for this purpose and to control the supply of gas to this burner by means responsive to the temperature of the preheated water, thus insuring a constant temperature. This embodiment of the invention also includes means for bringing the gas to be tested into heat exchanging relation with the preheated water, so that the temperature of the gas is raised to approximately the temperature of the preheated water. The improved device also includes a pressure regulator for controlling the flow of the gas which has been heated in the manner just described.

An improved part of this invention comprises two containers, each having a water inlet and a gas inlet. A valve and suitable pipe connections are provided between the gas inlets or ports of these two containers and the burner which burns the test gas, and there is also a pipe connection to the source of heated or conditioned gas described above. This valve and the pipes communicating therewith are so arranged that at one instant the gas port in one of the containers is connected to the burner and the gas port in the other container is connected to the supply of conditioned gas.

A valve and a plurality of pipes, similar to the valve and pipe connections just described, are arranged so as to connect the water inlets or ports of the two containers with the water heater and with the source of preheated water. The water heater referred to is the one to which heat is supplied by the burner which consumes the test gas. This last mentioned valve and associated pipe connections are arranged so that at one instant the water port in one container is connected to the water heater and the water port in the other container is connected to the source of preheated water. The water and gas valves just described should be actuated in a definite timed relation and it is entirely feasible to actuate these valves by a single means, although of course separate means can be employed for this purpose. The two valves may be arranged to operate in such a manner that at one instant water is being supplied to the heater from one of the two containers, while gas is being supplied to the burner from the other container. After the major portion of the gas in the container has been supplied to the burner, the gas and water valves may be operated so as to reverse the connections and supply water to the heater from the container which previously supplied gas to the burner and to supply gas to the burner from the container which previously supplied water to the heater. Some means, such as a float switch connected in circuit with an electrical device for actuating the gas and water valves, can be used for controlling the change in the connections between the containers and the other parts of the device.

This invention includes an improved heater in which the water is heated by the gas being tested. This heater is constructed in such a manner that there is a very efficient transmission of heat to the water. A mixing chamber is provided in fairly close proximity to the heating chamber, the purpose of this mixing chamber being to thoroughly mix the heated water prior to its coming in contact with the temperature sensitive element which serves to indicate or record the temperature of the heated water. An improved feature of this mixer is a device for supplying air to the stream of water flowing into the mixer. The stream of water entrains some of the air and the air bubbles serve to effect a thorough mixture of the water within the mixing chamber. It is preferred to have this air supply under control so that by adjusting the air port the rate at which water flows into the mixing chamber can be adjusted, as well as the amount of air discharged into the mixing chamber.

One of the improved features of this invention is the means for actuating the water and gas valves mentioned above. It is desirable to operate these valves in definite time relation and it is satisfactory to have the valve mechanism constructed in such a manner that rotation of the valve member through 90° effects the necessary change in directional flow of the gas and water. The improved valve actuating mechanism includes means for locking the valve member or members as the case may be, against accidental displacement, means for unlocking the valve member, means for rotating this member through a predetermined angle, and means for again locking the member in the new position. According to this invention, this series of operations is performed by a single motor connected, in a manner hereinafter described, to the valve member and to the locking means for this member. This motor can be arranged so as to be started and stopped by the float switches described above as being arranged within the two containers which are alternately filled with water and gas.

Figure 2:
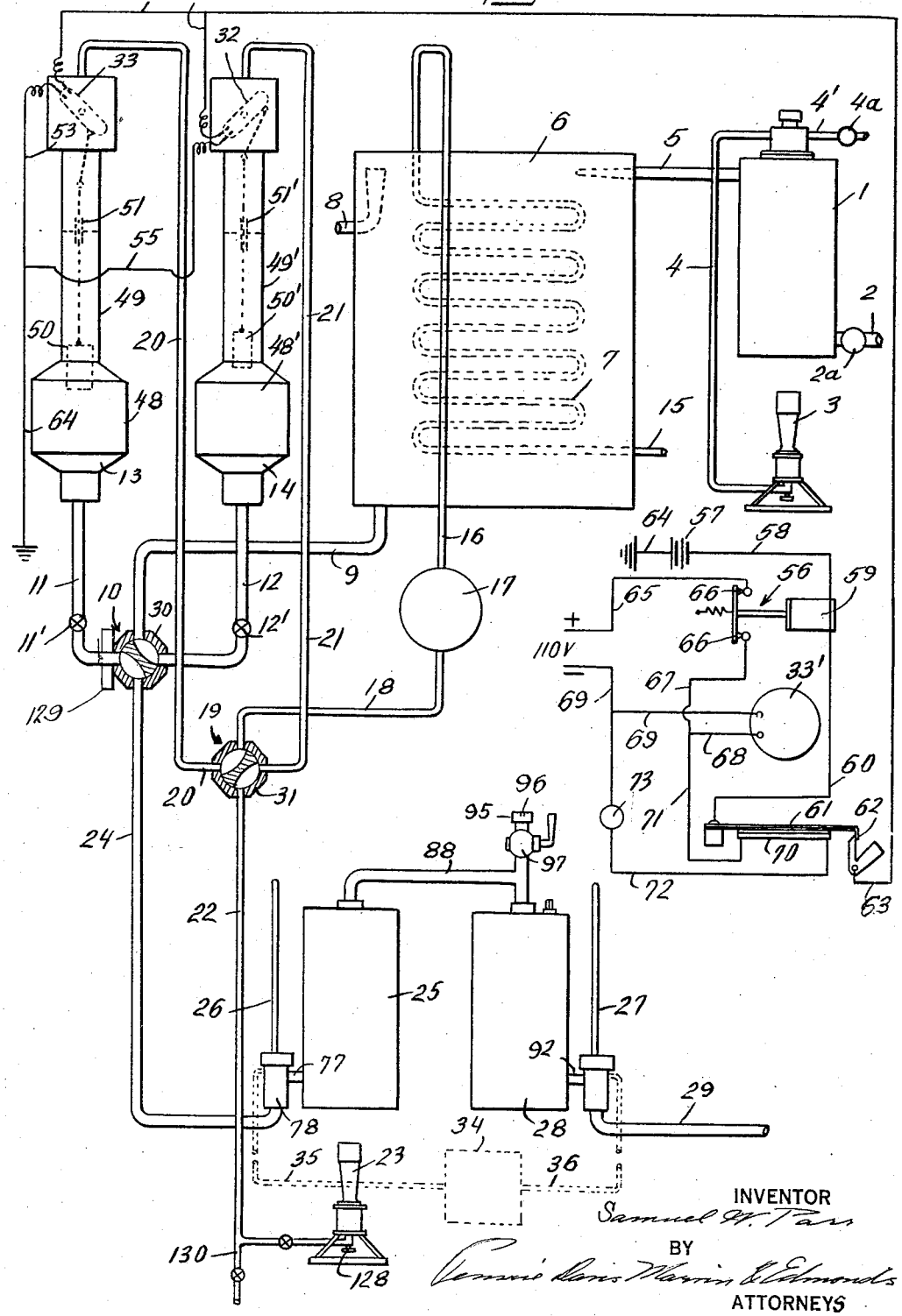

The various objects and advantages of this invention can be best understood by considering the following detailed description, which is to be taken in conjunction with the accompanying drawings, in which Fig. 1 is a perspective view (largely diagrammatic) of one embodiment of the improved calorimeter; Fig. 2 is a diagrammatic flow sheet illustrating the operation of the embodiment of the invention shown in Fig. 1; Fig. 3 is a vertical section view of the water preheater; Fig. 4 is a vertical section view of the water and gas valve mechanism and the means for actuating the same; Fig. 5 is an elevation of the parts shown in Fig. 4; Fig. 6 is an elevation, partly in section, of some of the parts shown in Fig. 4; Fig. 7 is a vertical section view of the heater and the mixing chamber associated therewith; Fig. 8 is a transverse section view of the heater taken on line 8—8 of Fig. 7; and Fig. 9 is a vertical section view of the gas pressure regulator.

As pointed out above, the improved calorimeter includes means for preheating a continuous supply of water and a continuous supply of the gas to be tested. The pressure of the gas is carefully regulated so that the gas is delivered under conditions of constant temperature and pressure. Equal volumes of water are heated by equal volumes of the gas to be tested and this process is carried out in a substantially continuous manner. The calorific value of the gas is at once determined by means responsive to the difference in temperature between the preheated water and the water which has been subjected to the heat of the burning test gas.

The flow sheet designated as Fig. 2 shows a water preheater 1, having a water inlet 2, which may be connected to a water main. A burner 3 supplies heat to the container 1, and gas is supplied to the burner through a pipe 4. This gas is supplied to the burner under the control of temperature responsive means within the preheating container 1. A pipe 5 supplies the preheated water to a tank 6, containing a coil 7. An overflow pipe 8 serves to maintain a constant water level within the tank 6. A pipe 9 delivers the water from the tank 6 to the water valve shown at 10, and pipes 11 and 12 extend between the valve housing and the containers 13 and 14. Water is alternately delivered to the containers 13 and 14 under the control of the valve 10.

The gas to be tested enters the heating coil 7 within the tank 6 through a suitable pipe connection 15. The gas flowing in this coil 7 is brought to a temperature approximately the same as that of the preheated water which is supplied to the tank 6 by the pipe 5. The gas leaves the coil 7 through a pipe 16, passes through a pressure regulator 17, and through a pipe 18 to the gas valve 19. Pipes 20 and 21 connect the housing of this valve with the containers 13 and 14 respectively, and gas is alternately supplied to these two containers under the control of the valve 19. A pipe 22 connects the valve 19 with a burner 23, and a pipe 24 connects the water valve 10 with a heating tank 25. The gas to be tested is burned in the burner 23 and supplies its heat to the water within the tank 25. A thermometer 26 may be used for the purpose of measuring or indicating the temperature of the water entering the tank 25, and a similar thermometer 27 may be used for the purpose of indicating the temperature of the water after it has left the container 25 and passed through the mixing chamber 28. The water after coming in contact with the temperature responsive element 27 may pass off to a suitable drain through a pipe 29.

The method of operation of the calorimeter can be best understood by first considering the manner in which gas and water flow through the system when the valves 10 and 19 occupy the positions shown in Fig. 2. The water which has been brought to a predetermined temperature in the preheater 1, and which has brought the temperature of the gas to substantially this same temperature, is free to flow through the pipe connection 9, valve housing 30 and pipe 12, into the container 14. At the same time, water which has been previously supplied to the container 13 is now free to flow through pipe 11, valve housing 30 and pipe 24, to the heater 25. While this is taking place, gas, which has previously been supplied to container 14 and which is now being forced out of this container by the water entering the container through pipe 12, flows through pipe 21, valve housing 31 and pipe 22 to the burner 23. At the same time, gas from the coil 7 is flowing through pipe 16, pressure regulator 17, pipe 18, valve housing 31 and pipe 20, into the container 13 to take the place of the water which is flowing out of this container and into the heater 25. It is thus apparent that the gas which occupied container 14 is being utilized to heat the water which occupied container 13. This continues until the water entering container 14 rises to a predetermined level therein and actuates a float switch 32. This closes a control circuit for the motor 33' and as soon as power is supplied to this motor it operates to rotate valves 10 and 19 through an angle of 90°, thus reversing the connections to the containers 13 and 14. As soon as this happens, the water which has just flowed into the container 14 is now free to flow in the opposite direction through pipe 12, then through the housing 30 and through pipe 24 to the heater 25. Also, the gas which was previously supplied to the container 13 under the control of valve 19 is now free to flow back through pipe 20 and then through the valve housing 31 and pipe 22 to the burner 23. Thus gas from container 13 is now being used for heating the water from container 14. The valves 10 and 19 are operated fast enough so that the supply of gas to the burner 23 is not appreciably interrupted and the flame is not extinguished. Similarly, the flow of water through pipe 24 to the heater 25 remains substantially constant, even though at one instant the water is being supplied from container 13 and then as soon as the valve mechanism operates, from the other container 14. The difference in the indications of the two thermometers 26 and 27 gives a measure of the calorific value of the gas supplied to the burner 23, and it is evident that this indication or record is entirely independent of the quantity of gas or of water passing through the system. It is not necessary that the rate of flow of the gas should be any predetermined value; it is merely necessary that the volume of gas under predetermined conditions of temperature and pressure should bear a definite relation to the volume of water. It is preferred that the volume of gas should be equal to the volume of water. It is not necessary to have the containers 13 and 14 of the same size, inasmuch as gas from one of these containers is used to heat water from the other and then the process is reversed so that in the complete cycle it is inevitable that equal quantities of gas are used to heat equal quantities of water.

It will be understood that when the position of valve 10 is such that water can flow through pipes 9 and 11 into the container 13, the level of the water rises in this container until it actuates a float switch 33 similar to the float switch 32 in container 14. As soon as this happens, the motor is again actuated to turn the valves 10 and 19 through another 90° to again reverse the connections to the containers 13 and 14. The calorimeter thus continues to operate and the thermometers 26 and 27 give a continuous indication of the temperatures of the water before and after passing through the heater 25. If it is so desired, a differential recording device 34 of any well-known construction can be connected by means of the connections 35 and 36 in such a manner that the device is responsive to variations in the difference in temperature between the water flowing into the heater 25 and the water flowing out of the mixer 28. In this way a permanent record of the calorific value of the gas can be obtained, and the device can be calibrated so that the calorific value can be read off directly in terms of B. t. u.'s per cubic foot of gas.

Having given a general description of the manner in which the several parts of the improved device cooperate, a detailed description will now be given of each of the component parts of the device.

The water preheater

The water preheater 1 and associated parts are shown in detail in Fig. 3. This figure shows a water receptacle 37 communicating with the inlet pipe 2 and with the outlet pipe 5. This receptacle is surrounded by a jacket 38 adapted to receive the hot gases from the burner 3 and conduct them up along the side of the water receptacle 37. A plate 39 forms a cover for the water receptacle and its enclosing jacket 38 and is provided with a plurality of openings or vents 40, through which the gases from the burner may ultimately escape. The water receptacle 37 is mounted on a suitable base 41, and the burner 3 is located directly below the water receptacle 37, so that the flame impinges against the bottom of this receptacle and the hot gases rise up around the receptacle. The pipe 4 supplies gas to the burner 3 and this gas is under the control of a valve 42 operated by a thermostat 43. This thermostat may be located within a suitable housing 44, extending down into the water receptacle 37 and the thermostat may communicate with a suitable gas or air chamber 45, also disposed within the water receptacle 37. When the temperature of the water within the receptacle 37 rises beyond a predetermined value, the air or gas within the chamber 45 expands and the valve 42 is forced against its seat so as to restrict or even entirely prevent gas from flowing through the valve to the burner 3. The gas is supplied through a pipe 4' and then flows down through a short passage 46 into the valve chamber 44. It escapes from this chamber under the control of the valve 42. It is desirable to have a restricted by-pass opening 47 leading directly into the pipe 4 from the pipe 4', so that at all times there is at least a small amount of gas being supplied to the burner 3. This prevents the flame from being extinguished when the valve 42 closes.

It has been found that this preheating device is very sensitive to slight changes in temperature and it is possible to control the temperature of the water flowing out of the receptacle 37 so closely that the variation is not more than .2° to .5° C. The operation of the valve 42 can be made extremely sensitive by providing within the chamber 45 a small quantity of a liquid having a boiling point approximately equal to the temperature which it is desired to maintain in the stream of water flowing out of the receptacle 37. It will be understood that whenever there is a tendency for the temperature of the water within the receptacle 37 to rise beyond the boiling point of the liquid within the chamber 45, considerable vapor is suddenly produced within this chamber and the valve is suddenly closed.

The temperature equalizer

As pointed out above, this invention contemplates the provision of some means for raising or lowering the temperature of the gas which is to be tested, to bring the temperature to some predetermined value. It will be understood that any suitable means may be employed for this purpose, but it is preferred to utilize the preheated water after it passes out of the preheater 1. A suitable device for bringing about this result comprises the tank 6, into which the water is discharged through the pipe 5 leading from the preheater 1. This tank is provided with an overflow vent pipe 8, which serves to maintain a constant water level within the tank 6. The gas which is supplied through a pipe 15 passes through the temperature equalizing coil 7 within the tank 6, and then passes through the pipe 16 to the pressure regulator 17. In this way the temperature of the gas is brought to a value substantially equal to that of the water in the tank 6.

The gas and water containers

The containers 13 and 14 mentioned above are adapted to receive the preheated water from the tank 6. This water flows through the pipe 9 to the valve housing 30 and it then flows alternately into containers 13 and 14 under the control of the water valve 10.

In the embodiment of the invention illustrated in the accompanying drawings, the two containers 13 and 14 are of substantially the same dimensions and configuration. The container 13 has an enlarged portion 48 in open communication with an elongated upright portion 49. The container 14 has a similar enlarged portion 48', communicating with an upright portion 49' of smaller diameter. A float 50 is provided within the portion 49 of container 13 and a similar float 50' is provided in the portion 49' of the other container 14. These two floats are connected by suitable linkages to the switches 32 and 33, guides 51 and 51' being provided for the purposes of insuring true vertical movement of the floats 50 and 50'. The switches 32 and 33 may be of the ordinary mercury type arranged in such a manner that when the switch occupies one position, current may flow between the contacts of the switch through the mercury. The switch 32 is shown in this position. When the switch occupies a position such as the switch 33 occupies in Fig. 2, the circuit is broken. The contacts of the switches 32 and 33 are connected in parallel by means of leads 52, 53, 54 and 55.

The floats 50 and 50' which control the operation of switches 32 and 33, are preferably arranged within the elongated upright portions 49 and 49' of the containers 13 and 14, in order that the operation of the switches may be critical. It will be understood that a small change in the volume of the liquid supplied to either of these containers will produce a correspondingly large change in the level of the liquid within the elongated upright portions of these containers.

The motor control system

The operation of the motor 33', which actuates the water and gas valves 10 and 19, is controlled by the float switches 32 and 33, located in the upper portions of the containers 13 and 14. These switches are electrically connected in parallel and serve to make and break a circuit which includes the relay 56. With switch 32 in the position shown in Fig. 2, the relay circuit is closed, the circuit being as follows: source of current 57, lead 58, coil 59, of relay 56, lead 60, thermal relay 61, contact 62, lead 63, lead 54, switch 32, lead 55, and lead 64 back to the source of current 57. The operation of coil 59 closes a circuit for the motor 33, this circuit being as follows: supply lead 65, relay contacts 66, lead 67, lead 68, and supply lead 69. When this circuit is closed, current is supplied to the heating element 70 of the thermal relay 61, this current being supplied through leads 71 and 72. A lamp or other resistance unit 73 may be connected in series with the heating element 70, if this is so desired.

The float switches 32 and 33 are closed alternately due to the flow of liquid into first one of the containers 13 and 14 and then into the other, and it will be understood that the closing of either one of these switches causes the motor 33' to operate, and this motor in turn actuates the gas and water valves 19 and 10 respectively to reverse the connections to the containers 13 and 14.

The water heater

The water heater shown at 25 in Figs. 1 and 2 is shown in detail in Fig. 7. This heater comprises a jacket or outer shell 74 connected to a base member 75. A closure plate 76 is provided at the top of the jacket 74. A liquid inlet is shown at 77. This inlet communicates with the chamber 78 which is in direct communication with the pipe 24, which is connected to the housing 30 of the valve 10. The sensitive element of the thermometer 26 or equivalent device may be arranged within the chamber 78 so that it will be responsive to the temperature of the water passing through this chamber.

A plurality of flues are provided within the water jacket 74 for the purpose of conducting hot gases from the burner 23 into efficient heat exchanging relation with the water in the jacket 74. The arrangement of flues shown in Fig. 7 includes a central flue 79 arranged directly above the tip of the burner 23. A plurality of tubes 80 are arranged around this central flue 79 and communicate therewith through a header 81. This header contains a plurality of vertical plates or partitions best shown at 82 in Fig. 8. These plates serve to guide the hot gases into the tubes 80. It is desirable to provide a baffle plate 83 at the upper end of the flue 79 and separated a short distance from the inner surface of the header 81. This baffle plate may rest on notched portions of the plates 82 as indicated in Fig. 7. Where this baffle plate is not provided, there is a tendency for condensible products of combustion to collect on the surface of the header 81, directly above the burner 23. Portions of this deposit may fall into the burner from time to time and interfere with the efficient operation of the burner. It has been found that when the baffle plate 83 is provided, this objectionable feature is eliminated. This is probably due to the fact that the plate 83, being out of contact with the water in the jacket 74, remains hot enough to prevent condensation of any of the constituents of the flue gas at points directly above the burner 23. It will be noted that the hot gases and water flow in countercurrent relation within the heater.

A collar 84 is provided around the tip of the burner 23, the diameter of this collar being somewhat larger than that of the burner tip, so as to permit air to flow up along the burner and thus supply the required oxygen for combustion of the gas. This collar 84 may be formed so as to provide an annular channel or manifold 85 communicating with the lower ends of the vertical tubes 80. A vent spout 86 communicates with this manifold and serves as a means for discharging the flue gases from the heater after they have passed up through the flue 79 and down through the tubes 80.

This spout also serves to discharge the water which collects within the flues as a result of the combustion gases coming into contact with the relatively cold walls of these flues. In this connection it may be pointed out that a graduated container 87 may be provided for the purpose of collecting the condensate discharged through the spout 86. By ascertaining the amount of the condensate formed while a measured quantity of gas is being burned in the heater, it is possible to compute the amount of heat which is liberated in forming this condensate. The heat of vaporization of this condensate may be thus taken into account in ascertaining the net heating value of the gas supplied to the burner 23.

A flue 79 is preferably provided with an enlarged lower portion 79' forming a combustion chamber of sufficient size so that the burner flame does not come in direct contact with the inner surface of the flue. This prevents the formation of deposits of carbon within the flue and it prevents incomplete combustion of the gases.

The mixing chamber

The mixing chamber shown diagrammatically at 28 in Figs. 1 and 2 is shown more in detail in Fig. 7. This chamber is connected to the water heater 25, just described, by pipe 88. This pipe, or a continuation thereof, is provided with an outlet 89 disposed at a certain level within the receptacle 90. I prefer to construct the outlet for this mixing chamber in such a manner that the outlet pipe communicates with the interior of the chamber at a level above the outlet of the pipe 88, for example, as shown at 91. This outlet pipe 92 may extend in a downward direction to a level near to or below the bottom 93 of the mixing chamber 28. This is clearly shown in Figs. 1 and 2. The container 90 is closed at the top by a suitable plate 94 and it will be understood that the arrangement of the pipes 89 and 92 of the container 90 is such that a siphoning action is produced. Any gas collecting in the upper part of the container 90 is drawn into the pipe 92 by the liquid escaping through this pipe and in this way a partial vacuum is created within the container 90. This, of course, has a direct effect upon the flow of liquid through pipe 88 into the mixing receptacle 90. A removable plug 94' is provided in the cover plate 94, directly above the outlet pipe 92, to permit ready access to this pipe for cleaning the same.

I have found that by providing an air port communicating with the pipe 88, it is possible to admit a restricted amount of air to the stream of liquid flowing into the mixing chamber. This air port also serves a useful function when the system is first started up, in that it permits the escape of any air which may become pocketed in that portion of the system adjacent to the air vent. This air port serves other important functions which will be pointed out below.

At 93', in Fig. 7, I have illustrated a T connection in the pipe 88 and it will be noted that a short piece of piping 94" communicates with this connection and is provided with a cap 95 having an orifice 96 in the end thereof. A valve 97, having a hand lever 98, can be used for controlling the entrance of air into the pipe 88. It has been found that if the valve 97 is wide open so that the maximum amount of air can flow into the pipe 88, the flow of liquid through pipe 88 will be retarded to a considerable extent. Furthermore, by adjusting the valve 97 to any desired position, the rate of flow of the liquid through pipe 88 can be regulated accordingly. Thus the air port and the valve for controlling the flow of air serve as a convenient means for regulating the flow of liquid into the mixing chamber 28.

Not only does the air connection just described serve as a means for controlling the flow of liquid, but it also serves as an efficient means for agitating the liquid within the receptacle 90. The air is carried into this receptacle after it has been entrained by the stream of liquid flowing through pipe 88 and it has been found that this air in bubbling up through the liquid in the receptacle 90 agitates the liquid thoroughly. Accordingly, all variations in the temperature of the liquid flowing through pipe 88 are smoothed out or obliterated within the mixing receptacle 90 and the temperature of the liquid flowing out through pipe 92 remains constant, unless, of course, the average temperature of the liquid supplied to the container 90 changes. The pipe 88 by projecting down into the body of liquid within the receptacle 90 causes the air entrained in the stream of liquid to bubble up through the body of liquid and agitate the same. While other means for agitating the liquid might be employed, yet I prefer to utilize for this purpose the air which is admitted through the orifice 96 and which also serves to regulate the flow of liquid through pipe 88.

The liquid in passing out of the container 90 through the pipe 92 flows into a small chamber 99 adapted to receive the sensitive element of a thermometer or equivalent device 27.

The valve operating mechanism

In Figures 4, 5 and 6, I have illustrated in considerable detail one embodiment of the means for actuating the water and gas valves shown at 10 and 19 in Fig. 2. It is convenient, although not necessary, to have these two valves connected to or operated by a common member; this insures operation of the water and gas valves in proper timed relation. In Fig. 4, I have shown a valve casing or housing 100, enclosing a valve member 101 constructed so as to form the water and gas valves 10 and 19 respectively. The valve housing 100 is provided with a tapered bore, and the valve member 101 is of similar configuration. A spring 102 is arranged so as to hold the valve member in place within the tapered bore of the housing 100, and an adjustable set screw 102' is arranged so as to prevent the spring 102 from causing the valve member to become lodged in its seat.

From the description given above in connection with Fig. 2, it will be understood that the connections to the containers 13 and 14 can be reversed by rotating the valve member 101 through an angle of 90°. It is desirable to have some means for rotating this valve member and this means should be under the control of the float switches in containers 13 and 14. The motor 33' is adapted to rotate the valve member 101 and, as pointed out above, the operation of this motor is controlled by the float switches 32 and 33. This motor serves to not only rotate the valve 101, but also to lock this valve in its new position and to release the valve when it is necessary to rotate the valve through another angle of 90°.

Figures 4, 5 and 6 show a ratchet wheel 103 fixed with respect to a pulley 104 and both of these elements are keyed or otherwise fixed to the valve member 101. A belt 105 connects the pulley 104 with a driving pulley 106 loosely mounted on the shaft 107 of the motor 33'. A spring 108 has one end thereof fixed to the shaft 107 and the other end fixed to the pulley 106 and the motor transmits power to the pulley 106 through this spring. The teeth of the ratchet wheel 103 cooperate with a dog 109, mounted on a stub shaft 110. This dog is fixed with respect to a pulley 111 and this pulley is connected to a driving pulley 112 by means of a belt 113.

A pin or abutment 114 projects from the side of the pulley 112 and cooperates with a similar pin or abutment 115 fixed to the motor shaft 107. Accordingly power can be transmitted to the pulley 112 through the pins 114 and 115.

The mode of operation of the valve actuating mechanism may be described as follows:

With the motor 33' rotating in the direction indicated by the arrows in Figs. 4 and 5, the first effect of the motor is to rotate the motor shaft through approximately 180° while the pulleys 106 and 112 remain stationary. The ratchet wheel 103 is locked and this prevents the pulleys 106 and 112 from rotating at the start. It is only when the pins 114 and 115 come into engagement with each other that the pulley 112 is caused to rotate. This causes the pulley 111 to rotate through a small angle and disengage the locking projection 116 from the ratchet wheel 103. The pulley 104 is now free to turn and the tension in the spring 108 acts through the pulley 106 and the belt 105 to rotate pulley 104 and the ratchet wheel and valve member 101 attached to this pulley. This continues until rotation of the ratchet wheel 103 is arrested by the abutment 117 (see Fig. 6) forming a part of the dog 109. Further rotation of the dog 109 and of the ratchet wheel 103 are thus prevented and the belt 113 commences to slip on the pulley 112. This slipping may be localized at this pulley by providing a pin 118 passing through the belt 113 and into the pulley 111. When rotation of the pulley 104 is arrested in the manner just described, continued rotation of the motor 33' serves to wind up the spring 108 to an even greater extent and ultimately the belt 105 commences to slip. By this time the operation of the motor 33' is interrupted due to the operation of the float switch in one of the containers 13 and 14 (see Figs. 1 and 2). As soon as the current supplied to the motor 33' is cut off, the spring 108 is free to recoil and this action of the spring serves to rotate the motor shaft in the direction opposite to that in which it was previously rotating. This causes the dog 109 to rotate so as to separate the abutment 117 from the ratchet wheel 103 and to force the projection 116 into an adjacent tooth of the ratchet wheel. These parts are preferably so constructed and arranged that as the projection 116 enters the tooth opposite the same, the ratchet wheel is forced around or advanced through a small angle and the ratchet wheel is then locked in this new position. This construction is desirable because it prevents the abutment 117 from engaging the same tooth of the ratchet wheel twice in succession. If the float switch fails to operate, the thermal relay 61 operates to break the motor circuit.

The motor 33' not only rotates the valve member 101, but it causes this valve member to be locked in its new position and it also serves to release the valve member when it is desirable to have it rotate through another angle, to again change the connections to the containers 13 and 14 above described. The operation of the spring 108 in reversing the angular movement of the dog 109 can be made more positive by making the belt 105 out of resilient material such as rubber, or by making it out of a coiled spring.

My improved means for actuating the valve member 101 has been found to be very reliable; it causes the valve member to be rotated very quickly through a complete angle of exactly 90° and the valve member is effectively locked in this position against accidental displacement until the dog 109 is actuated so as to release the valve member and permit continued rotation thereof.

Method of operation

In the particular embodiment of the invention illustrated in the accompanying drawings, water or some other suitable liquid is supplied to the container 1 through a pipe 2. This device serves the purpose of bringing the temperature of the liquid to some predetermined value. I have shown a burner 3 for raising the temperature of the liquid to a predetermined value, gas being supplied to this burner under the control of a thermostat located within the container 1. A pressure regulator 4$^a$ may control the supply of gas which is ultimately burned in the receptacle 1 and a pressure regulator 2$^a$ may be used for the purpose of regulating the pressure of the liquid supplied to the container 1. The liquid, after having its temperature brought to a predetermined value, then flows into a tank 6, where it comes into heat exchanging relation with a coil of pipe 7, through which the gas to be tested flows. The tank 6 and the coil 7 may be considered as a means for equalizing the temperatures of the gas and water or other liquid passing through these parts of the apparatus. The gas and liquid are then supplied alternately to each of the containers 13 and 14 under the control of valves 10 and 19 which are operated by the motor 33'. Hand operated valves 11' and 12' may be used for independently regulating the flow of liquid into each of the containers 13 and 14.

A pressure regulator 17 controls the supply of gas to the containers 13 and 14. The details of a suitable regulator for this purpose are shown in Fig. 9. This particular device comprises a housing 119 enclosing a collapsible pressure chamber 120. The interior of this chamber communicates with the atmosphere through a pipe 121 having a valve 122 therein which can be used to close this connection completely if this is desired. A lever 123 rotatably mounted on a suitable support 124 operates a valve 125 which controls the flow of gas from pipe 16 into the housing 119. One side of the pressure chamber 120 is connected to a lever 123 by means of links 126 and 127. It will be understood that as the gas pressure builds up within the housing 119, the pressure chamber 120 is compressed and the valve 125 closed.

The liquid which is supplied alternately to containers 13 and 14 actuates the float switches 32 and 33 and the switches in turn control the operation of the valves 10 and 19. The liquid flows out of the containers 13 and 14 into the heater 25 through a pipe 24, and in like manner the combustible gas flows out of containers 13 and 14 to the burner 23 through pipe 22. It will be understood that the gas is forced out of containers 13 and 14 by the liquid flowing into these containers from the tank 6. The rate at which gas flows out of containers 13 and 14 and consequently the rate at which liquid flows into these containers is determined by the adjustment of the valve 128. By opening the valve 128, the rate of flow of the gas can be increased and consequently the liquid flows into the containers 13 and 14 at a faster rate. The rate at which liquid flows out of containers 13 and 14 can be controlled by regulating the supply of air to the pipe 88 which connects the heater 25 with the mixer or temperature equalizer 28. The rate at which liquid flows out of containers 13 and 14 determines the rate at which gas flows into these containers through the pressure regulator 17. It is desirable to have the heater 25 so located with respect to the containers 13 and 14 and the valve 10 that liquid stops flowing out of the containers 13 and 14 even before the valve 10 is turned so as to establish communication with the liquid supply pipe 9. It is desirable to have the heater 25 arranged so that the level of the liquid therein is somewhat above the valve 10. These parts are not shown in this position in the accompanying drawings because of the difficulties involved in showing the parts in this desired relation to each other, and of course this desirable result can be accomplished in ways other than that just described.

Inasmuch as liquid stops flowing out of say container 13 before the valve 10 operates to connect this container to the liquid supply pipe 9, it will be apparent that the gas pressure within container 13 has an opportunity to build up before the valve 10 operates. This pressure builds up until the supply of gas is cut off by the pressure regulator 17. The improved device thus provides means whereby the gas can be supplied to containers 13 and 14 at a substantially constant predetermined pressure, and furthermore the temperature equalizer represented by the parts 6 and 7 makes it possible to supply this gas at a constant predetermined temperature.

While it is not necessary to determine the quantity of either the gas or the liquid passing through the system in order to determine the calorific value of the gas, yet it is entirely feasible to determine the quantity of gas or of liquid or both passing through the system. The containers 13 and 14 and parts associated therewith serve to isolate or measure off equal volumes of gas and liquid under constant conditions of temperature and pressure, and in order to determine the total amount of gas or liquid or both passing through these containers, it is merely necessary to measure the capacity of each and to ascertain the number of times each is filled with gas and liquid. By determining the number of revolutions of the valve member 101, it is possible to ascertain the quantity of gas or liquid or both passing through the system, because for every revolution of this valve member, a definite quantity of gas and a definite quantity of liquid pass through the containers 13 and 14. Accordingly a revolution counter connected to the valve member 101 can be used as a means for measuring the quantities of the fluids passing through the system. I have illustrated such a counter at 129 in Figs. 1, 2 and 4. This device may be provided with scales which cooperate with a suitable pointer to indicate directly the quantity of liquid passing through the system and the quantity of gas passing through the system. Accordingly, my improved device can be used as a gas meter as well as a means for determining the calorific value of a combustible gas. Where it is used merely for the purpose of measuring the quantity of gas, it is of course not necessary to burn the gas in the burner 23; it can be supplied to a gas main through a pipe 130, as indicated in Fig. 1. Furthermore, it is not necessary to heat the liquid where the device is used merely as a means for measuring the quantity of a fluid passing through the same. The liquid may be withdrawn from the containers 13 and 14 through a pipe 131 and brought back to the supply pipe 2 by some suitable means such as a pump 132.

The thermometers 26 and 27 can be used as a means for indicating the temperatures of the water as it flows into the heater 25 and as it leaves the mixer or temperature equalizer 28. In order that a permanent record of the calorific value of the gas may be obtained, a recording instrument 34 of any ordinary construction can be connected, as indicated in Figs. 1 and 2. This instrument operates as a differential temperature recording device and may be calibrated so as to indicate the calorific value of the gas. This instrument may be located close to the heater 25 or at some remote point, and of course a plurality of such instruments can be employed and located at various points, if this is so desired.

It is to be understood that my invention is not limited to the particular embodiment illustrated and described, but includes such modifications thereof as fall within the scope of the appended claims. The details of construction and the arrangement of the various parts can be varied without departing from the spirit of the invention. Furthermore, for some purposes, certain parts of the apparatus may be even eliminated without sacrificing all of the advantages of the invention.

I claim:

1. In a device of the type described, the combination of a liquid container, a gas burner for supplying heat to liquid in said container, means for supplying a volume of liquid to said container, and means for bringing a gas to a predetermined temperature and pressure, means for supplying to said burner a volume of said gas bearing a predetermined relation to the volume of liquid supplied to said container.

2. In a device of the type described, the combination of a liquid container, a gas burner for supplying heat to the container, means for bringing a gas to a predetermined temperature and pressure, and means for supplying equal volumes of liquid and gas to the container and burner respectively.

3. In a device of the type described, the combination of a liquid container, a gas burner for supplying heat to the container to raise the temperature of the liquid therein, means for bringing a gas to a predetermined temperature and pressure, means for supplying equal volumes of liquid and gas to the container and burner respectively, and indicating means responsive to changes in temperature of the liquid in said container.

4. In a device of the type described, the combination of a liquid container, a gas burner for supplying heat to the container, means for bringing a gas to a predetermined temperature and pressure, and means for continuously supplying equal volumes of liquid and gas to the container and burner respectively.

5. In a device of the type described, the combination of a liquid container, means for supplying heat to liquid in said container, means for continuously supplying liquid to said container, a mixing receptacle communicating with said container and having a liquid outlet, means for agitating the liquid in said receptacle and indicating means responsive to the temperature of the liquid before it has been heated in said container and after it has been agitated in said receptacle.

6. In a device of the type described, the combination of a liquid container, a burner for supplying heat to liquid in said container, means for supplying equal volumes of liquid and gas to said container and burner respectively, a mixing receptacle communicating with said container and having a liquid outlet, means for agitating the liquid in said receptacle, and indicating means responsive to the temperature of the liquid before it has been heated in said container and after it has been agitated in said receptacle.

7. In a device of the type described, a liquid container having an inlet and an outlet, means for supplying heat to said container, a receptacle communicating with the outlet of said container, means for causing liquid to flow through said container and into said receptacle, and means for introducing air into said receptacle to agitate the liquid therein and produce a substantially uniform temperature throughout the same.

8. In a device of the type described, a liquid container having an inlet and an outlet, means for supplying heat to said container, a receptacle, a liquid conduit connecting the outlet of said container with said receptacle, means for causing liquid to flow from said container into said receptacle through said conduit, adjustable means for introducing air into said conduit to regulate the flow of liquid through the same, and to agitate the liquid in said receptacle to produce a substantially uniform temperature throughout the same.

9. In a device of the type described, a liquid container having an inlet and an outlet, means for supplying heat to said container, a receptacle, a liquid conduit connecting the outlet of said container with said receptacle, means for causing liquid to flow from said container into said receptacle through said conduit, adjustable means for introducing air into said conduit to regulate the flow of liquid through the same, and means comprising a pipe extending from said conduit into the interior of said receptacle introducing this air into the body of the liquid within said receptacle.

10. In a device of the type described, the combination of a closed liquid receptacle, a pipe for introducing liquid into the receptacle, said pipe having an outlet at a certain level within the receptacle, an outlet pipe communicating with the interior of the receptacle above this level and extending downward to produce a siphoning action, and means for admitting a restricted amount of air into the pipe which introduces liquid into the receptacle.

11. In a device of the type described, the combination of means for supplying a liquid, means for bringing the liquid to a predetermined temperature, a container adapted to receive this liquid, a gas burner for supplying heat to the liquid in said container, and means for supplying to the burner a volume of combustible gas bearing a predetermined relation to the volume of liquid heated in said container.

12. In a device of the type described, the combination of means for supplying a liquid, means for bringing the liquid to a predetermined temperature, a container adapted to receive this liquid, a gas burner for supplying heat to the liquid in said container, means for supplying combustible gas, means for bringing this gas to a predetermined temperature, and means for supplying to the burner a volume of this gas bearing a predetermined relation to the volume of liquid heated in said container.

13. In a device of the type described, the combination of means for supplying a liquid, means for bringing the liquid to a predetermined temperature, a container adapted to receive this liquid, a gas burner for supplying heat to the liquid in said container, means for supplying combustible gas, means for bringing this gas to a temperature approximately equal to the said predetermined temperature and means for supplying to the burner a volume of this gas bearing a predetermined relation to the volume of liquid heated in said container.

14. In a device of the type described, the combination of means for supplying a liquid, means for preheating the liquid to a predetermined temperature, a container adapted to receive the preheated liquid, a gas burner for supplying heat to the liquid in said container, means for supplying combustible gas, means for bringing this gas into heat exchanging relation to the preheated liquid to equalize the temperatures of the gas and liquid, and means for supplying to the burner a volume of this gas bearing a predetermined relation to the volume of liquid heated in said container.

15. In a device of the type described, the combination of two containers, means for supplying a predetermined volume of liquid to one container, means for bringing a combustible gas to a predetermined temperature and pressure and for supplying to the other container a substantially equal volume of said gas, and means for burning this volume of gas in heat exchanging relation with the said volume of liquid.

16. In a device of the type described, the combination of two containers, means for supplying a liquid to one container, means for bringing a combustible gas to a predetermined temperature and pressure and for supplying said gas to the second container, means for burning this gas in heat exchanging relation with said liquid, means for supplying liquid to the second container to take the place of the gas previously supplied thereto, means for supplying gas at the said predetermined temperature and pressure to the first container to take the place of the liquid previously supplied thereto, and means for subjecting the gas and liquid supplied to said first and second containers respectively to the action of the means for burning gas in heat exchanging relation with a liquid.

17. In a device of the type described, the combination of two containers of equal capacity, means for supplying a liquid to one container, means for bringing a combustible gas to a predetermined temperature and pressure and for supplying said gas to the second container, a liquid heater, a gas burner for said heater, pipe connections between said heater and burner and said containers, whereby gas from one container can be utilized in heating the liquid from the other.

18. In a device of the type described, means for bringing a combustible gas to a substantially constant predetermined temperature and pressure, means for supplying a liquid, two containers, a liquid heater, a burner for said heater, pipe connections between the gas and liquid supplying means and the containers and between the containers and the heater and burner, rotatable valves for controlling the flow of gas and liquid, and means for rotating said valves in a certain timed relation to each other, the said pipe connections and valves being constructed and arranged so that liquid can be alternately supplied to said containers from the source of liquid and substantially continuously supplied to said heater from said containers, so that the gas can be alternately supplied to said containers and substantially continuously supplied to said burner from said containers.

19. In a device of the type described, the combination of means for supplying a combustible gas and a liquid, means for bringing the gas and liquid to substantially the same temperature, two containers, means for supplying the gas and liquid alternately to each container, means for controlling the pressure at which the gas is supplied to said containers, a liquid heater, a burner for said heater, and means for conducting gas and liquid from said containers to said burner and heater respectively.

20. In a device of the type described, the combination of means for supplying a combustible gas and a liquid, means for bringing the gas and liquid to substantially the same temperature, two containers, means for supplying the gas and liquid alternately to each container, means for controlling the pressure at which the gas is supplied to said containers, a liquid heater, a burner for said heater, pipe connections between said containers and the heater and burner, valves for controlling the flow of gas and liquid to the burner and heater respectively, and means responsive to changes in the liquid level in either of said containers for actuating said valves.

21. In a device of the type described, the combination of means for supplying a combustible gas and a liquid, means for bringing the gas and liquid to substantially the same temperature, two containers, means for supplying the gas and liquid alternately to each container, means for controlling the pressure at which the gas is supplied to said containers, a liquid heater, a burner for said heater, pipe connections between said containers and the heater and burner, valves for controlling the flow of gas and liquid to the burner and heater respectively, a motor for actuating said valves, and a float switch in each of said containers for controlling the operation of said motor.

22. In a device of the type described, the combination of means for measuring definite relative volumes of gas and liquid, a rotatable valve for controlling the flow of at least one of said fluids, an electric motor for operating said valve, and a float valve for controlling the operation of said motor.

23. In a device of the type described, the combination of a fluid container, a rotatable valve member for controlling the flow of fluid from said container, an electric motor for rotating said valve, a circuit for said motor, means actuated by said motor for arresting movement of said valve after it has been rotated through a predetermined angle, a float switch within said container for closing the motor circuit to rotate the valve, and to open the motor circuit after movement of the valve has been arrested, locking means for said valve, and resilient means arranged so as to be placed under tension by operation of the motor and adapted to momentarily release the valve and actuate the said locking means.

24. In a device of the type described, the combination of a fluid container, a rotatable valve member for controlling the flow of fluid from said container, an electric motor for rotating said valve, a circuit for said motor, means actuated by said motor for arresting movement of said valve after it has been rotated through a predetermined angle, a float switch within said container for closing the motor circuit to rotate the valve, and to open the motor circuit after movement of the valve has been arrested, locking means for said valve, and resilient means arranged so as to be placed under tension by operation of the motor and adapted to momentarily release the valve and actuate the said locking means, the said locking means being constructed and arranged so that when the same is actuated it rotates the valve through a small angle and then locks the valve.

25. In a device of the type described, the combination of a liquid container, a plurality of pipes within said container forming gas flues within which moisture may condense, a burner for supplying hot gases to said flues, means for supplying a liquid to said container, means for supplying a combustible gas to said burner, means for measuring the amounts of liquid and gas supplied to said container and burner respectively, indicating means responsive to the temperature of the liquid before and after it is heated in said container, and means for measuring the moisture condensed within said flues.

26. In a device of the type described, the combination of a container, means for alternately supplying to said container predetermined volumes of two fluids, and means for indicating the number of times the two fluids are supplied to said container.

27. In a device of the type described, the combination of a container, means for bringing a gas to a predetermined temperature and pressure and for alternately supplying to said container predetermined volumes of a liquid and of said gas, and means for indicating the number of times gas and liquid are supplied to said container.

28. In a device of the type described, the combination of a container, means for supplying two separate fluids, fluid connections communicating with said container and with the means for supplying two separate fluids, a rotatable valve member for controlling the supply of these fluids to said container in such a manner that they are alternately supplied thereto, and means for indicating the number of revolutions of the said valve member whereby the total volume of either fluid supplied to said container can be ascertained.

29. In a device of the type described, the combination of a container, means for bringing a gas and liquid to substantially the same temperature, means for bringing the gas to a predetermined pressure, means for alternately supplying to said container predetermined volumes of this liquid, and of this gas, and means for indicating the number of times gas and liquid are supplied to said container.

30. In a device of the type described, the combination of two containers, means for bringing a gas to a predetermined temperature and pressure, means for continuously supplying to each of said containers in succession predetermined volumes of a liquid and of said gas, and means for indicating the number of times gas and liquid are supplied to said container.

31. In a device of the type described, the combination of two containers, each having a gas port near the top thereof and a liquid port near the bottom thereof, pipe connections communicating with said gas and liquid ports, a single valve member for controlling the flow of gas and liquid through said pipe connections so that gas and liquid can be alternately supplied to each container, and means responsive to movement of said valve member for indicating the number of times gas and liquid are supplied to said containers.

32. In a device of the type described, the combination of two containers, pipe connections communicating with each container for supplying a gas and a liquid thereto, valves for controlling the supply of gas and liquid to said containers, a motor for operating said valves, a float switch in each of said containers for controlling the operation of said motor, and means for indicating the number of times gas and liquid are supplied to said containers.

33. In a device of the type described, the combination of a container, means for bringing a gas to a predetermined temperature and pressure, means for alternately supplying to said container predetermined volumes of a liquid and of said gas, a single rotatable valve member for controlling the supply of gas and liquid to said container, means for actuating said valve, and means responsive to the movement of said valve for indicating the quantity of each fluid supplied to said container.

34. In a device of the type described, the combination of two containers, means for bringing a gas to a predetermined temperature and pressure, means for alternately supplying to said containers predetermined volumes of a liquid and of said gas, means for independently regulating the flow of liquid into each of said containers, and means for indicating the number of times gas and liquid are supplied to said containers.

35. In a device of the type described, the combination of two containers, means for bringing a gas to a predetermined temperature and pressure, means for alternately supplying to each of said containers predetermined volumes of a liquid and of said gas, means adapted to indicate the number of times gas and liquid are supplied to said containers, and means for circulating the said liquid through said containers.

36. A method of non-intermittently determining the calorific value of a gas which comprises burning the gas in heat interchanging relation with a volume of water proportionate to the volume of gas burned, continuously feeding the gas to be burned by displacing the gas from a container with the water being heated, and registering the rise in temperature of the water due to the combustion of the said gas in units corresponding to the heat value of the gas.

37. A method for determining the calorific value of a gas comprising continuously burning gas in heat transferring relationship with water, maintaining a definite proportional relation of the water heated to the gas burned by using the water to control the volume of gas burned so as to attain a substantial temperature rise of the said water, and indicating the heat value of the gas as reduced to standard volume pressure conditions.

38. A gas calorimeter having in combination a heat absorption chamber, means for burning gas in said chamber, means for automatically and non-intermittently supplying gas to said burning means, means for non-intermittently and automatically passing water through the said chamber in amounts equal in volume to the volume of gas being burned, and means for automatically indicating the change in temperature of the said water in passing through the said chamber.

39. A method of determining the calorific value of gas which comprises burning gas in heat interchanging relation with water, continuously measuring the water prior to its being heated, continuously measuring the gas being burned by displacing the gas with the measured water volume for volume, and continuously recording the rise in temperature of the water due to the heat of combustion of the gas in terms of the B. t. u. value of the gas.

40. A method of determining the calorific value of gas which comprises burning gas in heat interchanging relation with water, continuously supplying gas to the burners in a volume equal to the volume of water being heated, utilizing the water prior to its being heated to measure the gas, and continuously recording the rise in temperature of the water due to the heat of combustion of the gas in units corresponding to the heat value of the gas.

41. A method of determining the calorific value of gas which comprises burning gas in heat transferring relation with water, supplying the gas and water to a container wherein they contact one another, simultaneously and continuously withdrawing the gas and water from the container in measured portions by displacing the gas with the water volume for volume, and recording the rise in temperature of the water due to the heat of combustion of gas in units corresponding to the heat value of the gas.

42. A method of determining the calorific value of gas which comprises burning gas in heat interchanging relation with water, continuously measuring the water being heated, continuously measuring the gas being burned by displacing the gas with the measured water volume for volume, equalizing the pressure of the measured gas and water and then sending them to the burner and heat interchanger respectively, and recording the rise in temperature of the water due to the heat of combustion of the gas in units corresponding to the heat value of the gas.

43. A method of determining the calorific value of gas which comprises burning gas in heat interchanging relation with water, equalizing the pressure of water being heated with the pressure of gas being burned, and continuously measuring the volume of gas and water while under the same pressure by displacing the gas volume for volume with the measured volumes of water, and recording the rise in temperature of water due to the heat of combustion of gas in units corresponding to the heat value of the gas.

44. In a gas calorimeter, a combustion chamber having a gas burner therein, a water chamber mounted in heat interchanging relation to the combustion chamber, means for measuring the rise in temperature of the water passing through the water chamber, and means for measuring the water and gas prior to passing to their respective chambers, comprising means for continuously measuring separate volumes of gas and water that have a definite proportional relationship to one another while using the water for displacing the gas being measured.

45. In a gas calorimeter, a combustion chamber having a burner therein, a water chamber mounted in heat interchanging relationship to the combustion chamber, means for measuring the rise in temperature of the water passing through the water chamber, a displacement meter for continuously measuring separate volumes of gas and water having a definite proportional relationship to one another, and means for separately conducting the measured gas and water to the burner and water chamber respectively.

46. In the art of determining the heating value of gas, the steps of bringing the gas to a predetermined temperature, flowing and measuring the gas in contact with a stream of water at constant temperature to maintain the gas at constant temperatures, burning said gas and transferring the heat of said burning to said water, and maintaining said gas at constant density at the point of measuring it.

47. In the art of determining the heating value of gas, the steps of bringing the gas to a predetermined temperature, measuring the gas at constant density and humidity, burning said gas in heat transferring relation to flowing water, and measuring the increase in temperature of said water.

48. In the art of determining the heating value of gas, the steps of bringing the gas to a predetermined temperature, measuring the gas at constant density and temperature, metering said gas in contact with water flowing in the same direction as the gas to maintain the humidity of the gas constant, and burning said gas in heat transferring relation to said water.

49. In the art of determining the heating value of gas, the steps of maintaining the density and temperature of the gas constant, metering the gas in contact with a stream of water flowing in the same direction as the gas to maintain the humidity of the gas constant, burning said gas in heat transferring relation to said water, and registering the heat value of the gas in a continuous manner.

50. A calorimeter apparatus comprising in combination means for heating water by gas whose calorific value is to be determined, means for measuring gas and water in constant proportions, connections between said measuring means and said heating means, means for registering the calorific value of the gas, said connections and said measuring means having only sufficient volumetric capacity to maintain a continuous flow of gas to said heating means, whereby a minimum lag between a given change in the calorific value of the gas and the registration of said change is provided.

In testimony whereof I affix my signature.

SAMUEL W. PARR.